April 8, 1930. W. S. FISHER 1,754,189
SLEEVE VALVE ENGINE AND OILING MEANS
Filed March 12, 1927 2 Sheets-Sheet 2
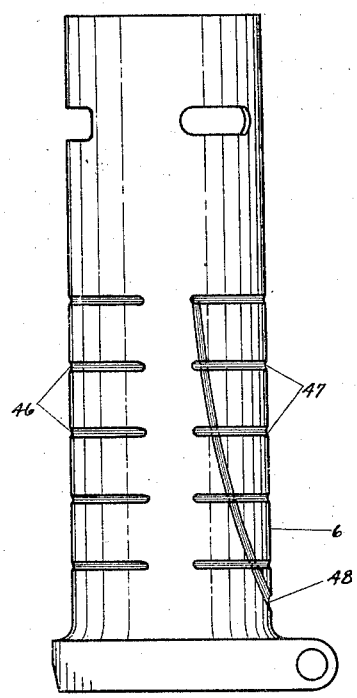
Fig. IV.
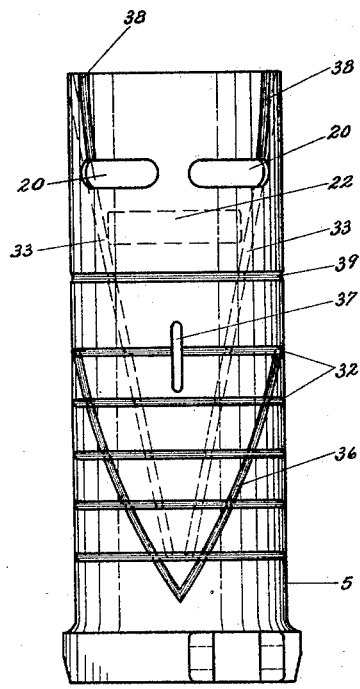
Fig. III.
INVENTOR.
WALTER S. FISHER
BY Chester H. Broselton
ATTORNEY.

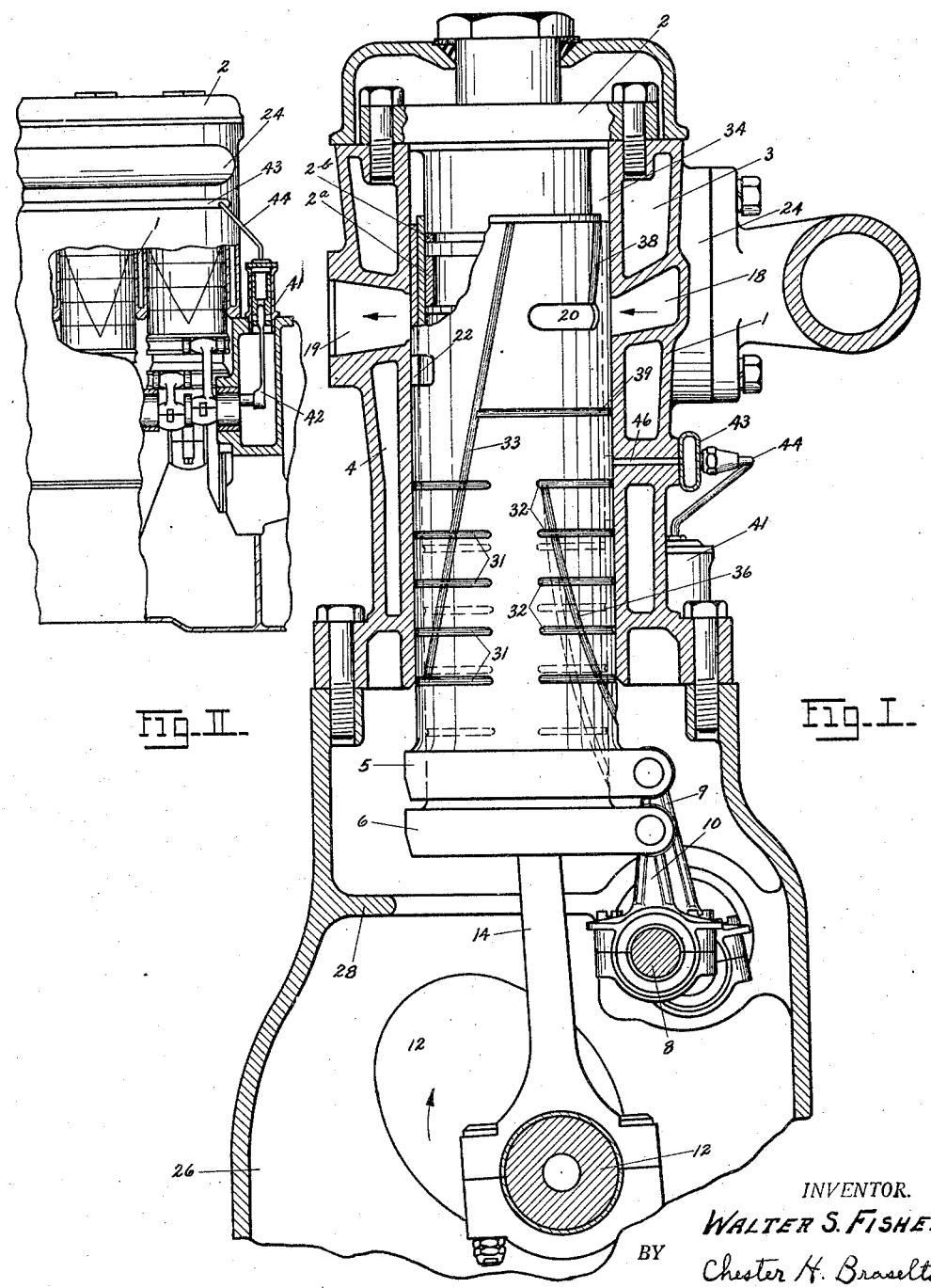

Patented Apr. 8, 1930

1,754,189

UNITED STATES PATENT OFFICE

WALTER S. FISHER, OF TOLEDO, OHIO, ASSIGNOR TO THE WILLYS-OVERLAND COMPANY, OF TOLEDO, OHIO, A CORPORATION OF OHIO

SLEEVE-VALVE ENGINE AND OILING MEANS

Application filed March 12, 1927. Serial No. 174,895.

My invention relates to sleeve valve engines and more particularly to the cooling and lubrication of engines of the above designated class.

One of the objects of this invention is to provide means by which adequate lubrication to all parts of the sleeves is realized without incurring excessive lubrication on any portion thereof.

A further object of the invention is to provide means for supplying fresh oil to the region of the sleeve adjacent the intake ports, another object being to provide a mechanism by which disposition may be made of excessive quantities of oil that accumulate on the sleeves and that would otherwise result in high oil consumption and smoke discharge.

An additional object of the invention is to provide an oiling system for gasoline engines by which relatively cool oil is supplied to the parts undergoing lubrication.

Another object in the invention resides in the provision of a lubricating system which is adapted to afford the additional function of cooling parts of the motor exposed to excessive heat.

It is a further object of the invention to provide a device that is capable of withdrawing an excess of oil that may accumulate on the surface of the sleeves without interfering with the carburetion of the engine. These together with other objects, will become more apparent from a consideration of the drawings and the accompanying description.

The present invention overcomes certain of the difficulties which are inherent in the construction of sleeve valve motors of the so-called Knight class. It is generally recognized that the system of lubrication employed at the present time in sleeve valve engines is not entirely satisfactory for the reason that adequate lubrication of the upper portions of the sleeve at high engine speeds is generally attended with excessive exhaust smoke, whereas any efforts to obviate the undesirable smoking quality of the engine result in inadequate lubrication and consequent sticking of the engine parts. These shortcomings are particularly noticeable in engines which are designed for variable speed operation.

By the present invention I have provided a sleeve construction which affords adequate lubrication for the exhaust portion of the sleeve. In so doing, the sleeve is grooved or channeled whereby oil is drawn from the lower portions of the sleeve to the sleeve chamber in the cylinder head, which chamber is maintained at sub-atmospheric pressure in order to encourage the oil upwardly.

By avoiding any excess or accumulation of oil on the intake side of the sleeve, I find that the smoking difficulties are overcome. To this end therefore I have provided a system of grooving together with a pump mechanism which cooperate to discharge excess oil, back to the crankcase and away from the region of the intake port. It should be noted that the auxiliary pumping means may supply a fluid of any desired character, for example, it may be fresh oil which is particularly desirable around the intake portion of the sleeve, inasmuch as the oil in this region is diluted readily by reason of its exposure to the intake manifold. The pump mechanism may serve an additional function, for by introducing oil or other fluid, such as air or a mixture of air and oil, it is possible to control the temperature of the engine parts.

Referring now to the drawings, there is illustrated an embodiment of my invention, which may be preferred, in which:

Figure I is an elevational view partly in section, of a sleeve valve engine of the Knight type.

Fig. II is a side elevational view, partly in section and on a somewhat smaller scale, of an engine having a pump connection to a plurality of cylinders.

Fig. III is an elevational view of the outer sleeve of a Knight engine, and illustrates the manner in which the outer sleeves are grooved, and Fig. IV is an elevational view of the inner sleeve.

In practicing my invention I provide an engine cylinder 1, closed at its upper end by a head 2 which includes a sealing ring $2^a$ and compression ring 2ᵇ, and surrounded by water cooling chambers 3 and 4. Within the cylinder 1 are two reciprocating sleeves 5 and 6 which are driven by means of an eccentric shaft 8 and rods 9 and 10. The inner sleeve 6 is the working barrel of the engine within which is a piston (not shown) that drives the crankshaft 12 through its connecting rod 14. Cylinder 1 is provided with an inlet port 18 and an exhaust port 19, which periodically register with sleeve inlet ports 20 and exhaust ports 22. The inlet port 20 communicates with an intake manifold 24 which is common to all of the cylinders of the engine, as shown in Fig. II. A crankcase 26 supports the cylinder 1, houses the rotating parts and provides the usual storage spaces for a supply of lubricant.

Under certain conditions sleeve valve engines of this type tend to accumulate large quantities of oil on the surface of the sleeves, the oil being thrown on the sleeves by the connecting rod 14 and crankshaft 12.

According to the present practice, lubrication of the upper portion of the sleeves is accomplished by the adhesive and capillary forces existing between the oil and the metallic reciprocating parts. When such an engine is operated at a high rate of speed, an excessive quantity of oil makes its way to the upper portion of the sleeve, resulting in an unnecessary accumulation, and frequently causing smoking of the engine. By the present invention only a portion of the sleeve surface is afforded for the upward movement of the oil whereas the remaining portion is devoted to its downward flow. Referring particularly to the outer sleeve, it will be noted that channels 31 form one set of grooves whereas channels 32 form another set of grooves. The first mentioned channels are rendered communicative with each other by means of substantially vertical channel 33 which interconnects the several parallel grooves or channels, and extends upwardly to a space or chamber 34 in the head of the cylinder. Communication is likewise established between these grooves so far as the lubricant is concerned by the reciprocative character of the movement of the sleeve. The channels 32 on the opposite side of the sleeve are interconnected by a V-shaped groove 36 which extends downwardly sufficiently to remain exposed at all times within the crankcase. A slot 37 is provided below the intake ports and between the two downwardly inclined channels for the purpose hereinafter to be set forth. The chamber 34 above the sleeves is maintained at a reduced pressure by means of two channels 38 which establish communication with the intake manifold. Between the intake ports 20 and the group of channels 32 a single channel 39 is provided by preference, which interconnects the two vertically inclined channels 33 extending upwardly to the chamber 34 above the sleeves.

Means for supplying a fluid under pressure is provided in the form of a reciprocating pump 41 having a connecting rod 42 operatively connected to the shaft 8. It supplies the fluid to a small auxiliary manifold 43 through a pipe 44, the manifold in turn supplies the pressure fluid to the surface of the sleeve through a duct 46 which is formed in the cylinder block and registers with the slot 37 formed in the outer sleeve, and which is in communication with grooves 32 and 36.

In operating this portion of the machine the fluid is forced through the duct 46 and into the group of channels therebelow, eventually discharging into the crankcase by way of the V-shaped channels 36 carrying with it any oil which may have accumulated on this portion of the sleeve. It will be obvious that the pump may be of such a character as to be rendered effective only when the engine is operated at a high rate of speed. If it is desired, the pump may be utilized to supply cool fresh oil. Obviously, in this capacity the inlet duct may be located in any desired position. Furthermore, the function of the pump is not limited to the supplying of a lubricant, but may be extended to the supplying of any fluid, such as air, which will act as an ejector to discharge accumulations of oil into the crankcase and thereby prevent their upward passage to the region of the intake port and subsequent entry into the working bore of the engine.

As an optional embodiment, a channel 39 is interposed preferably between inlet ports 20 and grooves 32 to offset the tendency of the engine to draw lubricant through inlet port 20, which is supplied by the pump. In this capacity it affords a bypass around inlet port 20 to groove 33 and thence upwardly to space 34.

The inner sleeve is constructed similarly to the outer sleeve in that it is provided with a set of grooves 46 corresponding to grooves 31 on the outer sleeve and likewise with a second set 47 with a V-shaped groove or channel 48 corresponding to the groove 36 likewise on the outer sleeve. It will not be apparent that the slot 37 in the outer sleeve serves to communicate the pressure fluid, which is supplied by the pumping means, to the inner sleeve.

From the description hereinabove set forth, it will be apparent to those skilled in the art that although I have described but a single embodiment of my invention, it is susceptible to many modifications without departing from its scope, and I desire therefor that it be limited only to accord with the prior art and the appended claims.

I claim:

1. A sleeve valve engine embodying a cylinder, a piston adapted to reciprocate within the cylinder, and a valve mechanism operated in synchronized relation with the piston comprising a cylindrical sleeve having admission and discharge ports, and means for facilitating the lubrication of the sleeves consisting of a mechanism adapted to supply a gas under positive pressure to the surface of the sleeve.

2. A sleeve valve engine embodying a cylinder, a piston adapted to reciprocate within the cylinder, a valve mechanism operated in synchronized relation with the piston comprising a cylindrical sleeve having admission and discharge ports, said sleeve having a grooved surface whereby a fluid supplied thereto together with any accumulated lubricant, may be dispelled from the intake port of the sleeve through the grooves formed on the surface thereof and means for supplying a gas to the grooved surface adjacent the intake port.

3. A sleeve valve engine embodying a cylinder and a crankcase portion associated therewith, a piston adapted to reciprocate within the cylinder, and a valve mechanism operated in synchronized relation with the piston, including a sleeve having admission and discharge ports, a portion of said sleeve being adapted to permit upward progress of oil on the surface of the sleeve, another portion of the sleeve being cooperatively disposed with respect to a fluid injecting means, said fluid injecting means being adapted to force oil accumulated on the surface of the sleeve into the crankcase portion of the engine.

4. A sleeve valve engine embodying a cylinder, a piston adapted to reciprocate within the cylinder, and a valve mechanism operated in synchronized relation with the piston, including a sleeve having admission and discharge ports, a portion of said sleeve being adapted to permit upward progress of oil on the surface of the sleeve, another portion of the sleeve being grooved and co-operatively disposed with respect to a fluid injecting means, said fluid injecting means being adapted to force oil accumulated on the surface of the sleeve into the crankcase portion of the cylinder.

5. A sleeve valve engine embodying a cylinder, a piston adapted to reciprocate within the cylinder, and a valve mechanism operated in synchronized relation with the piston, including a sleeve having admission and discharge ports, one portion of said sleeve being grooved to establish communication with a chamber above the sleeves and within the cylinder adapted to promote upward progress of oil, means in communication with the chamber adapted to maintain subatmospheric pressure therein for the purpose of facilitating the upward trend and distribution of the oil over the one portion of the sleeve, a second grooved sleeve portion independent of the first, co-operatively disposed with respect to means for supplying a fluid to the surface thereof, and adapted to cause the fluid together with any accumulated oil to be dispelled from the intake port of the sleeve.

6. A sleeve valve engine embodying a cylinder, a piston adapted to reciprocate within the cylinder, and a valve mechanism operated in synchronized relation with the piston, including a sleeve having admission and discharge ports, and means for cooling the reciprocating elements of the engine by injecting a cool gas over the sleeve surface.

7. A sleeve valve engine embodying a cylinder and a crankcase portion, a piston adapted to reciprocate within the cylinder, and a valve mechanism operated in synchronized relation with the piston including a sleeve having admission and discharge ports; and gaseous pressure means for dispelling accumulations of oil in the region of the intake port of the sleeve and causing the same to flow downwardly over the sleeve surface to the crankcase portion of the engine.

8. A sleeve valve engine embodying a cylinder, a piston adapted to reciprocate within the cylinder, and a valve mechanism operated in synchronized relation with the piston, including a sleeve having admission and discharge ports provided with a grooved portion on the discharge port side of the sleeve, said grooved portion being in communication with a chamber above the sleeve, means for maintaining sub-atmospheric pressure within the chamber, a second grooved sleeve portion disposed below the intake port and independent of the first-mentioned grooved portion, provided with means for supplying a fluid thereto and adapted to dispel the fluid and any accumulated oil away from the intake port.

9. A sleeve valve engine embodying a cylinder, a piston adapted to reciprocate within the cylinder, and a valve mechanism operated in synchronized relation with the piston, including a sleeve having admission and discharge ports, provided with a grooved portion on the discharge port side of the sleeve, said grooved portion being in communication with a chamber above the sleeve; means for maintaining a sub-atmospheric pressure within said chamber, a second grooved sleeve portion, said portion being disposed adjacent the intake port independent of the first grooved portion, provided with means for supplying a fluid thereto, said means being adapted to discharge the fluid and accumulated oil away from the intake port, and a third grooved portion interposed between the intake port and the second grooved portion, said third grooved portion being in communication with the first-mentioned portion.

10. In an internal combustion engine having a cylinder, a reciprocating sleeve within the cylinder provided with inlet and exhaust ports, said sleeve including two independent sets of oil grooves, one of said sets being adapted to induce an upward flow of oil, the other of said sets having grooves positioned below said ports provided with means for forcing oil downwardly therethrough.

11. In an internal combustion engine having a cylinder, a reciprocating valve sleeve within the cylinder provided with inlet and exhaust ports, and two independent sets of oil grooves formed on said sleeve, one of said sets being adapted to distribute oil on the exhaust port side of said sleeve, the other set of grooves being arranged wholly beneath said inlet port and having an outlet beneath the cylinder, and means for applying fluid pressure to said second set of grooves.

12. In an internal combustion engine having a cylinder, a reciprocating valve sleeve within the cylinder provided with inlet and exhaust ports, and two independent sets of oil grooves, one of said sets being adapted to distribute oil on the exhaust side of said sleeve, the other of said sets being arranged wholly beneath said inlet port and having an outlet beneath said cylinder, said first set having one of the grooves thereof positioned between said inlet port and said second set of grooves, and means for applying fluid pressure to the second set of grooves.

13. In an internal combustion engine, the combination of a cylinder, a pair of concentric valve sleeves therein having intake and exhaust ports, the outer of said sleeves including a set of grooves positioned beneath said inlet port, means for supplying fluid under pressure to the set of grooves, an outlet for said fluid below its point of entry to the grooves, and said outer sleeve having an opening therein whereby a portion of the fluid may pass through the outer sleeve to the surface of the inner sleeve.

14. In an internal combustion engine, the combination of a cylinder, a reciprocating sleeve therein having inlet and exhaust ports, said sleeve having oil grooves thereon forming an interconnected network beneath said inlet port, said grooves having an outlet beneath the cylinder, and means for introducing fluids under pressure to the upper portion of said network.

15. In an internal combustion engine the combination of a crankcase, a cylinder disposed thereon, a reciprocating valve sleeve therein having inlet and exhaust ports, said sleeve having a plurality of substantially horizontal oil grooves thereon positioned beneath said inlet port, said oil grooves extending partially around the surface of said sleeve, a substantially vertical groove interconnecting the first-mentioned grooves and communicating with said crankcase, and means for introducing fluids under pressure to the sleeve at a point below said intake port and above at least one of the horizontal grooves.

16. In an internal combustion engine the combination of a cylinder, a pair of concentric valve sleeves having inlet ports therein, and two independent sets of oil grooves upon the outer sleeve, one of said sets being adapted to conduct oil upwardly of said sleeve from the lower portion thereof, the other of said sets having its grooves positioned below said inlet port, means for forcing oil downwardly in the last-mentioned set of grooves, and a passageway through the outer sleeve from the second set of grooves to the surface of the inner sleeve.

17. In an internal combustion engine having a cylinder provided with a depending head, the combination of a reciprocating sleeve valve having inlet and exhaust ports, disposed within the cylinder in lapped relation with the head, said head forming an annular space with the sleeve and cylinder, the sleeve including a passageway extending from the lower portion thereof to the space above said sleeve, a second passageway likewise formed on said sleeve extending from the space to said inlet port, and a third passageway below said inlet port, said last-named passageways being independent of said first and second-named passageways and extending downwardly below the cylinder, said cylinder having an opening therein in communication with the last named passageways, and pressure means whereby fluids may be forced through the cylinder opening into said last named sleeve passageways.

18. In an internal combustion engine the combination of a cylinder, a crankcase disposed below the cylinder, a reciprocating valve sleeve projecting from within the cylinder and having inlet and exhaust ports therein, said sleeve being provided with two independent sets of lubrication grooves on said sleeve, one set of grooves being positioned on the exhaust port side of said sleeve and adapted to carry lubricant from the crankcase upwardly to the upper portion of said sleeve, the other set of grooves being positioned below the inlet port of said sleeve, and including a groove extending below said cylinder, and means for supplying fluid under pressure to the second set of grooves adapted to discharge the contents thereof downwardly to said crankcase.

In testimony whereof, I affix my signature.

WALTER S. FISHER.